United States Patent
Song et al.

(10) Patent No.: US 12,346,808 B2
(45) Date of Patent: Jul. 1, 2025

(54) FEDERATED LEARNING FOR ANOMALY DETECTION

(71) Applicant: NEC Laboratories America, Inc., Princeton, NJ (US)

(72) Inventors: Dongjin Song, Princeton, NJ (US); Yuncong Chen, Plainsboro, NJ (US); Cristian Lumezanu, Princeton Junction, NJ (US); Takehiko Mizoguchi, West Windsor, NJ (US); Haifeng Chen, West Windsor, NJ (US); Wei Zhu, Rochester, NY (US)

(73) Assignee: NEC Corporation, Tokyo (JP)

( * ) Notice: Subject to any disclaimer, the term of this patent is extended or adjusted under 35 U.S.C. 154(b) by 1001 days.

(21) Appl. No.: 17/395,118

(22) Filed: Aug. 5, 2021

(65) Prior Publication Data

US 2022/0044117 A1    Feb. 10, 2022

Related U.S. Application Data (60) Provisional application No. 63/075,450, filed on Sep. 8, 2020, provisional application No. 63/070,437, filed on Aug. 26, 2020, provisional application No. 63/062,031, filed on Aug. 6, 2020.

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC ............... G06N 3/08; G06N 3/02; G06N 3/04
USPC .................................. 705/12, 25; 706/12, 25
See application file for complete search history.

(56) References Cited

U.S. PATENT DOCUMENTS

| | | | |
|---|---|---|---|
| 11,593,485 B1* | 2/2023 | Briliauskas | G06F 21/566 |
| 2012/0284791 A1* | 11/2012 | Miller | G06F 21/554 |
| | | | 726/22 |
| 2019/0050515 A1* | 2/2019 | Su | G06N 3/045 |
| 2020/0028862 A1* | 1/2020 | Lin | H04L 63/104 |
| 2021/0089878 A1* | 3/2021 | Greenewald | G06N 3/047 |
| 2022/0343167 A1* | 10/2022 | Chawla | G06N 5/01 |
| 2023/0177349 A1* | 6/2023 | Balakrishnan | H04L 67/10 |
| | | | 706/25 |

OTHER PUBLICATIONS

Clark, "A Comparison of Rule and Exemplar-Based Learning Systems", in P. B. Brazdil et al. (eds.), Machine Learning, Meta-Reasoning and Logics, © Kluwer Academic Publishers 1990, pp. 159-186. (Year: 1990).*

Wang et al., "Adaptive Federated Learning in Resource Constrained Edge Computing Systems", arXiv ID: 1804.05271v3, Feb. 17, 2019, pp. 1-20. (Year: 2019).*

(Continued)

*Primary Examiner* — Hwei-Min Lu
(74) *Attorney, Agent, or Firm* — Joseph Kolodka (57) ABSTRACT

Methods and systems for training a neural network include collecting model exemplar information from edge devices, each model exemplar having been trained using information local to the respective edge devices. The collected model exemplar information is aggregated together using federated averaging. Global model exemplars are trained using federated constrained clustering. The trained global exemplars are transmitted to respective edge devices.

18 Claims, 6 Drawing Sheets

(56) References Cited

OTHER PUBLICATIONS

Corinzia et al., "Variational FederatedMulti-Task Learning", arXiv ID: 1906.06268, Jun. 14, 2019, pp. 1-10. (Year: 2019).*

Nguyen et al., "DÏoT: A Federated Self-learning Anomaly Detection System for IoT", 2019 IEEE 39th International Conference on Distributed Computing Systems (ICDCS), Jul. 2019, pp. 756-767. (Year: 2019).*

Savazzi et al., "Federated Learning with Cooperating Devices: A Consensus Approach for Massive IoT Networks", arXiv ID: 1912.13163, Dec. 27, 2019, pp. 1-16. (Year: 2019).*

Wang et al., "Federated Learning with Matched Averaging", arXiv ID: 2002.06440; pub. date on Feb. 15, 2020, pp. 1-16. (Year: 2020).*

Liu et al., "Privacy-preserving Traffic Flow Prediction: A Federated Learning Approach", arXiv ID: 2003.08725, Mar. 19, 2020, pp. 1-12. (Year: 2020).*

Duan et al., "Self-Balancing Federated Learning With Global Imbalanced Data in Mobile Systems", IEEE Transactions on Parallel and Distributed Systems, vol. 32, No. 1, date of publication Jul. 15, 2020, pp. 59-71. (Year: 2020).*

Liu et al., "Deep Anomaly Detection for Time-series Data in Industrial IoT: A Communication-Efficient On-device Federated Learning Approach", arXiv ID: 2007.09712; pub. date on Jul. 19, 2020, pp. 1-11. (Year: 2020).*

Sun et al., "Intrusion Detection with Segmented Federated Learning for Large-Scale Multiple LANs", 2020 International Joint Conference on Neural Networks (IJCNN), Jul. 19-24, 2020, pp. 1-8. (Year: 2020).*

McMahan, H. Brendan, et al. "Communication-Efficient Learning of Deep Networks from Decentralized Data", InArtificial intelligence and statistics, PMLR. Apr. 10, 2017, pp. 1-10.

Pang, Guansong, et al. "Deep Learning for Anomaly Detection: A Review", ACM Computing Surveys (CSUR). Mar. 5, 2021, pp. 1-38.

Wang, Hongyi, et al. "Federated Learning with Matched Averaging", arXiv preprint arXiv:2002.06440. Feb. 15, 2020, pp. 1-16.

* cited by examiner

FEDERATED LEARNING FOR ANOMALY DETECTION

RELATED APPLICATION INFORMATION

This application claims priority to U.S. Provisional Patent Application No. 63/062,031, filed on Aug. 6, 2020, to U.S. Provisional Patent Application No. 63/070,437, filed on Aug. 26, 2020, and to U.S. Provisional Patent Application No. 63/075,450, filed on Sep. 8, 2020, each incorporated herein by reference in its entirety.

BACKGROUND

Technical Field

The present inventions relates to anomaly detection in cyber-physical systems, and, more particularly, to the use of federated learning among local models to improve model efficacy.

Description of the Related Art

While machine learning models benefit from being trained on large amounts of data, data sharing policies may limit the availability of such data. For example, data collected at an edge device may not be forwarded to a central location, out of concern for privacy violations.

SUMMARY

A method for training a neural network includes collecting model exemplar information from edge devices, each model exemplar having been trained using information local to the respective edge devices. The collected model exemplar information is aggregated together using federated averaging. Global model exemplars are trained using federated constrained clustering. The trained global exemplars are transmitted to respective edge devices.

A system for training a neural network model includes a hardware processor, a network interface in communication with edge devices, and a memory. The network interface is configured to collect model exemplar information from the edge devices, each model exemplar having been trained using information local to the respective edge devices, and to transmit trained global exemplars to respective edge devices. The memory stores a computer program product, which, when executed by the hardware processor, causes the hardware processor to aggregate the collected model exemplar information together using federated averaging and to train the global model exemplars using federated constrained clustering using a processor.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Federated learning may be used in a variety of machine learning applications, particularly where security and privacy make training a machine learning model challenging. In particular, federated, unsupervised anomaly detection, which makes use of data collected during normal operation of heterogeneously distributed, isolated edge devices, may take into account unseen heterogeneous normal data at various devices, and may take into account the heterogeneity of local models that are trained on biased data.

Toward that end, an exemplar-based approach for multivariate time series anomaly detection can preserve data privacy on edge devices and can handle data that is not distributed in an independent, identical way over edge devices. Local exemplars are used to perform anomaly detection and to capture a data distribution of clients, which may then be used to guide federated aggregation of local models in a distribution-aware manner. Each edge device may update relevant exemplars, while a centralized server aggregates the exemplars, based on alignment and clustering. The local exemplars may be modeled as parameters of a neural network, and may be trained end-to-end at the clients.

Figure 1:
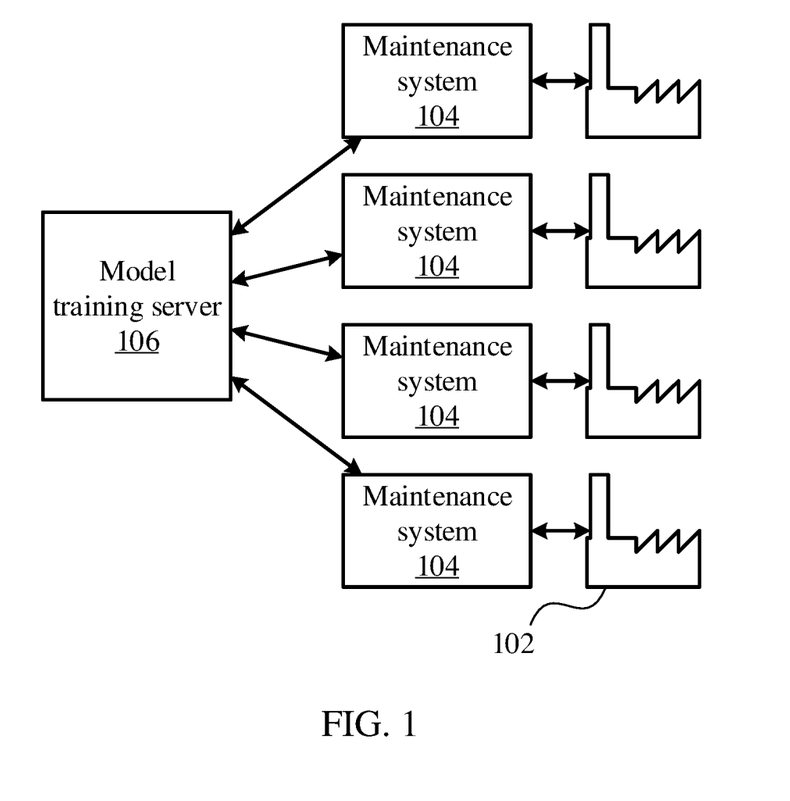
FIG. 1 is a block diagram showing a federated model training system that collects local model information from a set of edge devices at a central server and that trains global model exemplars for use at the edge devices, in accordance with an embodiment of the present invention.

Referring now in detail to the figures in which like numerals represent the same or similar elements and initially to FIG. 1, maintenance system 104 in the context of respective monitored systems 102 are shown. The monitored system 102 can be any appropriate system, including physical systems such as manufacturing lines and physical plant operations, electronic systems such as computers or other computerized devices, software systems such as operating systems and applications, and cyber-physical systems that combine physical systems with electronic systems and/or software systems. Exemplary systems 102 may include a wide range of different types, including power plants, data centers, and transportation systems.

One or more sensors within each respective monitored system 102 record information about the state of the monitored system 102. The sensors can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors can be in any appropriate format and can include sensor log information generated with heterogeneous formats.

The sensors of a monitored system 102 may transmit the logged sensor information to a respective local maintenance system 104 by any appropriate communications medium and protocol, including wireless and wired communications. The local maintenance system 104 can, for example, identify abnormal behavior by monitoring the multivariate time series that are generated by the sensor. Once anomalous behavior has been detected, the maintenance system 104 communicates with a system control unit to alter one or more parameters of the monitored system 102 to correct the anomalous behavior.

Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The maintenance system 106 thereby automatically corrects or mitigates the anomalous behavior. By identifying the particular sensors 104 that are associated with the anomalous classification, the amount of time needed to isolate a problem can be decreased.

Each of the sensors outputs a respective time series, which encodes measurements made by the sensor over time. For example, the time series may include pairs of information, with each pair including a measurement and a timestamp, representing the time at which the measurement was made. Each time series may be divided into segments, which represent measurements made by the sensor over a particular time range. Time series segments may represent any appropriate interval, such as one second, one minute, one hour, or one day. Time series segments may represent a set number of collection time points, rather than a fixed period of time, for example covering 100 measurements.

Anomaly detection at the local maintenance systems 104 may be governed by respective machine learning models, for example implemented as neural networks. Each such model may include two parts, including a local part that is trained using data collected at the respective monitored system 102, and a global part that is trained by a central model training server 106. Rather than passing raw data to the model training server 106, the maintenance systems 104 may provide their respective locally trained parts. The model training server 106 may then train the global part using information gleaned from the collected local parts, transmitting the trained global part to the respective maintenance systems 104. In this manner, information that is collected at the respective local maintenance systems 104 may be used to improve the anomaly detection performed of other such maintenance systems 104, without risking potentially sensitive local data.

Even in a case where the different monitored systems 102 are substantially identical, they may experience very different circumstances. For example, two different systems 102 may experience different types of operation, both of which may be characterized as "normal" operation. A locally generated model, which derives its training data from only one such system, may identify the normal operation of another system as anomalous. To avoid this problem, aggregation of model information may be used to account for multiple different environments, without transmitting the potentially sensitive local data itself.

Figure 2:
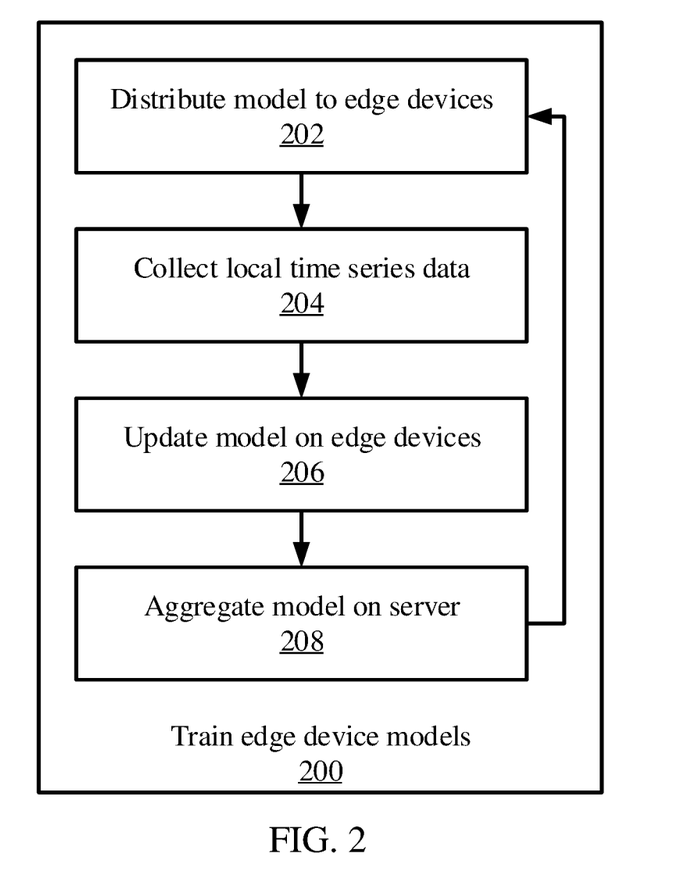
FIG. 2 is a block/flow diagram of a method for training edge device models using without transmitting potentially sensitive local sensor information to a central server, in accordance with an embodiment of the present invention.

Referring now to FIG. 2, a method of federated learning is shown. Block 202 distributes an initial model to the edge devices (e.g., the local maintenance systems 104) from the server 106. Block 204 collects local time series data at the edge devices, for example by collecting time series information from sensors at the respective monitored systems 102.

Block 206 uses the local time series data to update the models at the edge devices 104. Each edge device 104 may perform its own respective update, based on the data that it has available. Such learning may be performed in an unsupervised fashion, as the data collected from the monitored system 102 may not be labeled.

Block 208 aggregates the models from the respective edge devices 104 at the server 106. This aggregation is used to update the server's model. Processing then returns to block 202, as the updated server model is distributed to the edge devices 104. This process may repeat indefinitely, as new information is collected by the edge devices 104, or may be repeated until model convergence is reached. New models may be distributed by the server 106 periodically, or after a sufficient amount of change from a previously distributed model.

Anomaly detection and model updating in block 206 may be performed using the models, with exemplar-based anomaly detection generating exemplars. Client models may then be aggregated at the server side, under the guidance of these exemplars. Exemplar-based anomaly detection may use augmentation-free contrastive learning to extract latent representations, which may be used for deep clustering and anomaly detection. Clustering and representation learning may be performed at the same time, to mutually boost their performance.

In this step, it may be assumed that there are L edge devices 104, with the $l^{th}$ local device learning a device-specific model, which includes an embedding network $f(\cdot; \theta^l)$ for feature encoding, and an exemplar module in which a set of K local exemplars for the $l^{th}$ device $C^l = \{c_1^l, \ldots, c_K^l\} \in \mathbb{R}^{d \times K}$ is learned to capture potential normal patterns in a hidden feature space. The local model may be trained based on time series data collected at the $l^{th}$ local device 102 for unsupervised anomaly detection. The central server 106 aggregates local models from different devices to form the global model in block 208. The embedding network of the global model $g(\cdot; \bar{\theta})$ may be obtained by federated averaging, and the global exemplar module with K learnable exemplars $U = \{u_1, \ldots, u_K\}$ is obtained by aggregating and aligning all local exemplar modules. The server 106 sends the global model to different edge devices 104 to update their local models.

Given a training set made up of data collected during normal operation, including n multivariate time series segments $\{X^i\} \in \mathbb{R}^{m \times t}$, where m is a number of time series and t is the length of the segments, the objective function for learning may be formulated as:

$$\min_{\theta, C} \frac{1}{n} \sum_{i=1}^n KL(p_i \| q_i) - \alpha^T \log\left(\frac{1}{n} \sum_{i=1}^n q_i\right) + 1/n \sum_{i=1}^n M(X^i)$$

where $\theta$ is a set of parameters for a neural network f, $KL(\cdot)$ is the Kullback-Leibler divergence, $q_i \in \mathbb{R}^K$ is the cluster membership vector for the $i^{th}$ data, where $q_{ij}$ is the probability of assigning the $i^{th}$ data to the $j^{th}$ exemplar, and $\alpha \Sigma \mathbb{R}^K$ is a prior distribution over the exemplars to encourage cluster sizes on the edge devices to match the prior. The value of $q_{ij}$ may be calculated as:

$$q_{ij} = \frac{e^{\gamma_1 s(f(X^i), c_j)}}{\sum_{k=1}^{K} e^{\gamma_1 s(f(X^i), c_k)}}$$

where $s(f(X^i), c_j)$ may be implemented by a cosine similarity function, $C = \{c_1, c_2, \ldots, c_K\} \in \mathbb{R}^{K \times d}$ is the set of K learnable exemplars (e.g., clustering centers), and $\gamma_1$ is a scaling factor. The term $q_{ij}$ provides the probability of assigning the $i^{th}$ data to the $j^{th}$ exemplar. The term $\alpha$ may be initialized with a uniform distribution as $$\frac{1}{K} \mathbf{1},$$

and it may be updated with an exponential moving average at every iteration as:

$$\alpha = \lambda \alpha + (1 - \lambda) \left(\frac{1}{n}\right) \sum_{i=1}^{n} p_i$$

where $\lambda$ is a parameter that changes the learning rate. The term $p_i$ may be a target cluster membership vector, with elements that are determined as:

$$p_{ij} = \frac{\left(\frac{q_{ij}^2}{\sum_{i'=1}^{n} q_{i'j}}\right)}{\sum_{j'} \left(\frac{q_{ij'}^2}{\sum_{i'=1}^{n} q_{i'j'}}\right)}$$

The neural network f may include, for example, long short-term memory (LSTM) layers or bidirectional LSTM layers to encode dynamics in the multivariate time series. The neural network f may further include a fully connected layer to capture the exemplar, and this may be jointly trained with the embedding network parameter $\theta$ in an end-to-end manner. The first term performs deep embedding clustering. This is performed on a per-device basis, and so the superscript l is omitted for brevity.

The third term may be used for representation learning with deep relative preserving, to encourage the latent space to preserve the local similarity of the raw feature space as:

$$M(X^i) = \min_{\theta} \log \left(1 + \sum_{\substack{(p \in \mathcal{P}_i) \\ (n \notin \mathcal{P}_i)}} e^{\gamma_2 (s_{in} - s_{ip})}\right)$$

where $\mathcal{P}_i$ is the set of nearest neighbors of the $i^{th}$ example, $\gamma_2$ is a learnable scale factor, and $s_{ij}$ is determined by the cosine similarity between the embedding of the $i^{th}$ and the $j^{th}$ samples. This term encourages the similarity of positive pairs to be larger than that of negative pairs. This may follow the formulation of a circle loss. To avoid computational and storage costs for the graph, the graph may be approximated by the samples within each minibatch.

The anomaly score may be calculated by the absolute similarity between samples and exemplars. However, the above objective function only enforces relative margin. To address this, the similarity of the $i^{th}$ sample may be directly optimized against a soft approximation of the nearest exemplar: $b_i = \Sigma_{j=1}^{K} q_{ij} c_j$. An absolute margin enforcing term may be added to produce a final objective function:

$$\min_{\theta, C} -\frac{1}{n} \sum_{i=1}^{n} KL(p_i \| q_i) - \alpha^T \log\left(\frac{1}{n} \sum_{i=1}^{n} q_i\right) + \frac{1}{n} \sum_{i=1}^{n} M(X^i) + \frac{1}{n} \sum_{i=1}^{n} \log\left(1 + e^{-\gamma_3 (f(X^i)^T z_i - m)}\right)$$

where $\gamma_3$ is a learnable scale factor and m is a margin. Using softplus for the fourth term provides a similar scale to the other terms, and can prevent tuning hyperparameters to balance the terms. The anomaly score of a testing sample x may be computed as the negative cosine similarity to its nearest exemplar:

$$\text{Score}(x) = -\max_{j} s(f(X), c_j)$$

After a number of rounds of training on the $l^{th}$ local device, the parameters of the embedding network $\theta^l$, the set of exemplars $\{c_1^l, \ldots, c_K^l\}$ and the cluster prior $\alpha^l$ may be transmitted from the edge device 104 to the server 106.

Figure 3:
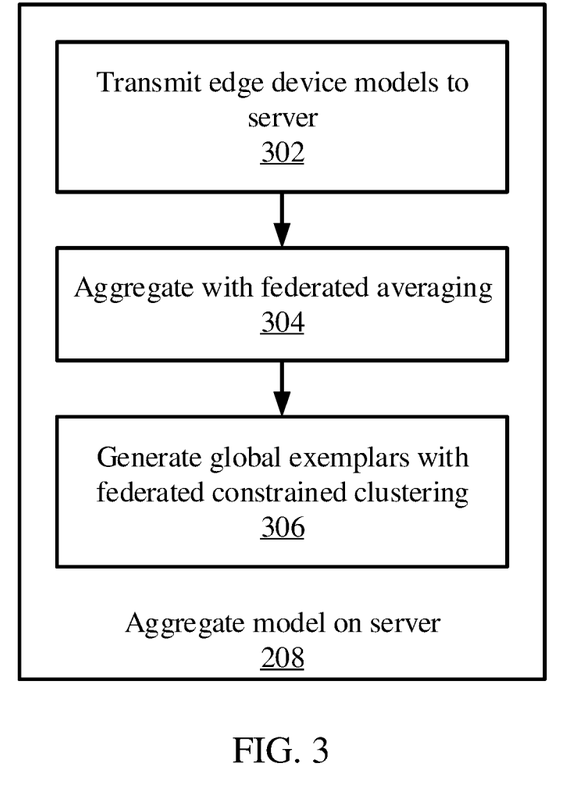
FIG. 3 is a block/flow diagram of a method for aggregating local edge device models at a central server to generate global exemplars that capture diverse operating conditions, in accordance with an embodiment of the present invention.

Referring now to FIG. 3, additional detail is provided on the aggregation of the model at the server 106 in block 208. At block 302, the edge devices 104 transmit their trained edge device models to the server 106 by any appropriate communications medium and protocol. The server 106 gathers the locally trained models and conducts data-free aggregation to construct a global model. A federated average may be performed in block 304 using an element-wise average of local exemplars, based on the prior that local models are trained with the same initialization. However, due to heterogeneity of local data, exemplars trained on different edge devices 104 may not match well. To address this, federated matched averaging 304 may average exemplars after matching them by their values. However, the prior and the value of the exemplars may be used jointly, with learned exemplars being projected to a latent space and then being matched according to their projected positions. Federated constrained clustering may be performed to generate global exemplars in block 306.

Given L edge devices 104, with K exemplars at each device, the exemplars that are uploaded from the $l^{th}$ device $(l \in L)$ may be denoted as $C_l = \{c_1, c_2, \ldots, c_K\} \in \mathbb{R}^{K \times d}$, along with the size of each cluster as $\alpha_l$. The global exemplars U are expressed as $\{u_1, \ldots, u_K\}$ and capture the overall distribution of data experienced by all devices. The term N=LK may be used to denote the total number of exemplars. Federated constrained exemplar clustering may then aggregate the local models, and may be expressed as:

$$\min_{\phi, \{v_1, \ldots, v_K\}} -\frac{1}{N} \sum_{i=1}^{K} \sum_{l=1}^{L} \alpha_i^l p_{il}^T \log q_{il} - 1^T \log\left(\frac{1}{N} \sum_{i=1}^{K} \sum_{l=1}^{L} p_{il}\right) + \frac{1}{N} \sum_{i=1}^{K} \sum_{l=1}^{L} R(c_i^l)$$

where ϕ represents the parameters of the projection network h and where $\{v_1, \ldots, v_K\}$ are the latent cluster centers in the output space of h. $R(\cdot)$ is a constraint function that encourages the learned projection h to give similar embeddings for exemplars that have the same initialization. The term $q_{il}$ is defined similarly to $q_{ij}$ above:

$$q_{il,j} = \frac{e^{\gamma_4 s(h(c_i^l), v_j)}}{\sum_{k=1}^{K} e^{\gamma_4 s(h(c_i^l), v_k)}}$$

where $\gamma_4$ is a scale factor. The term $p_{il}$ is defined in a similar manner as $p_{ij}$, above. The constraint function may be defined as:

$$R(c_i^l) = \alpha_i^l \log\left(1 + \sum_{m=1}^{L} \sum_{j=1}^{K} e^{\gamma_5 e_{ij} s(h(c_i^l), h(c_j^m))}\right)$$

where $e_{ij}=1$ if i=j, meaning that the two local exemplars share the same initialization, and is −1 otherwise. The term $\gamma_5$ is a scale factor.

The global exemplars $\{u_1, \ldots, u_K\}$ may be obtained based on the clustering indicator matrix:

$$u_z = \frac{1}{\sum_{i=1}^{K} \sum_{l=1}^{L} q_{il,z} c_i^l}$$

Figure 4:
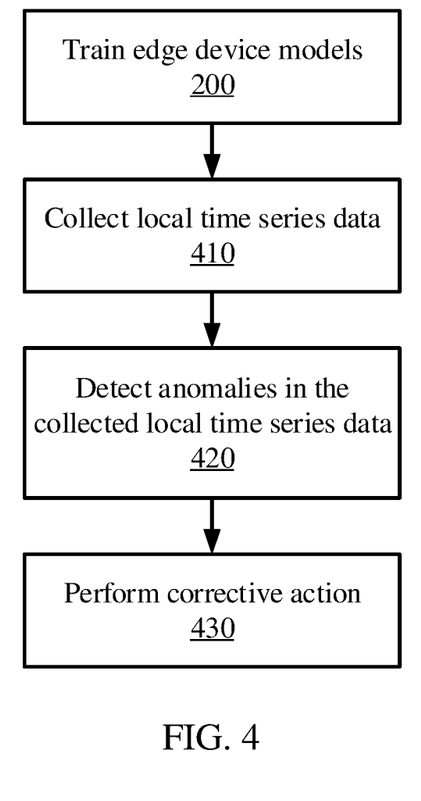
FIG. 4 is a block/flow diagram of a method of detecting and correcting anomalous activity in a cyber-physical system using anomaly detection models that are trained using federated model training; in accordance with an embodiment of the present invention.

Referring now to FIG. 4, a method of anomaly detection and correction is shown. Block 200 trains edge device models, as described above, using global exemplars that are generated by aggregation of locally trained model information. Block 410 collects new local time series data at the maintenance systems 104, from the respective monitored systems 102. This new local time series data may reflect recent operational characteristics of the respective monitored systems 102, and may be expressed as time series information.

Block 420 uses the edge device models to detect anomalies in the local time series data. For example, a particular monitored system 102 may be in a state of abnormal operation, and the respective time series information that is provided to the edge device 104 may therefore be identified as being anomalous.

When an anomaly is detected, block 430 may perform a corrective action. For example, the maintenance system 104 that detects the anomaly may trigger a change within the monitored system to automatically correct the abnormal operational state.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 5:
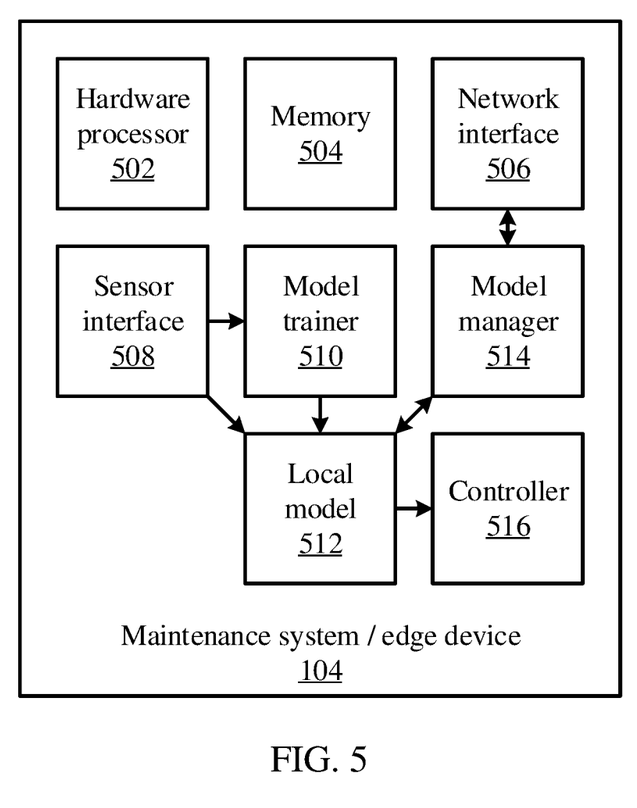
FIG. 5 is a block diagram of an edge device that detects and corrects anomalous activity in a cyber-physical system using anomaly detection models that are trained using federated model training; in accordance with an embodiment of the present invention.

Referring now to FIG. 5, additional detail on the maintenance system/edge device 104 is shown. The maintenance system 104 includes a hardware processor 502 and memory 504. A network interface 506 provides communication between the maintenance system 104 and the model training server 106, and may operate by any appropriate wired or wireless communications medium and protocol.

A sensor interface 508 receives information from one or more sensors in the monitored system 102. The communication with the sensors may be by any appropriate wired or wireless communications medium and protocol, and may include any combination of dedicated sensor inputs and general-purpose network communications. The collected sensor information may be used by a model trainer 510 to train a local model 512. A model manager 514 may communicate with the server 106, transmitting the local model 512 for aggregation, and may receive global exemplars from the server 106 to be used in future model training.

During operation, new sensor data may be provided as an input to the local model 512, to determine whether the monitored system 102 is behaving abnormally. In the event that an anomaly is detected, controller 516 may automatically perform a corrective action. For example, the controller may communicate with a control system within the monitored system 102, to deliver an instruction to compensate for operational parameters that are out of normal bounds.

Figure 6:
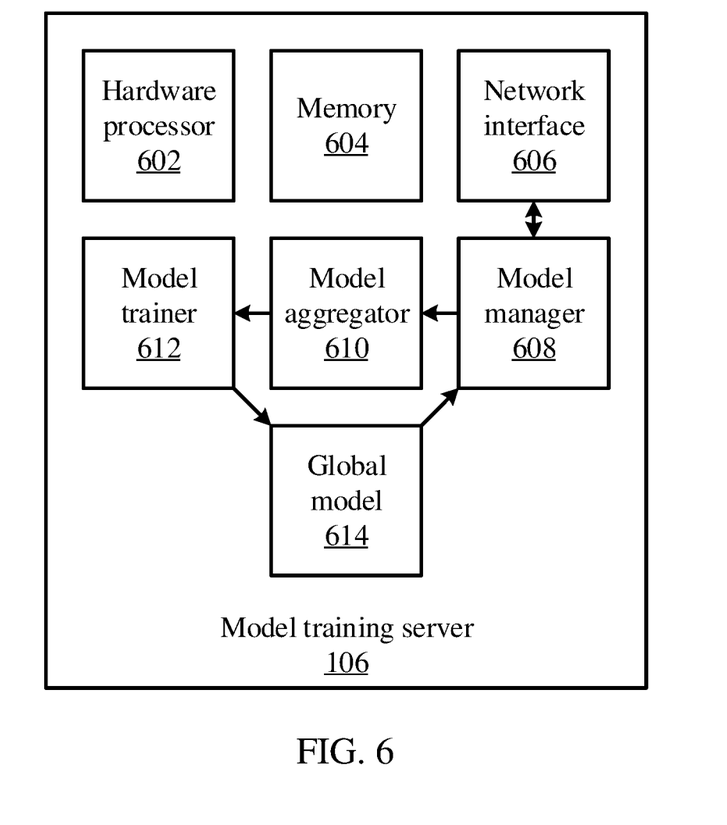
FIG. 6 is a block diagram of a model training server that aggregates local edge device models and generates global exemplars that capture diverse operating conditions, in accordance with an embodiment of the present invention.

Referring now to FIG. 6, additional detail on the model training server 106 is shown. The model training server 106 includes a hardware processor 602 and memory 604. A network interface 606 provides communication between the maintenance system 104 and the model training server 106, and may operate by any appropriate wired or wireless communications medium and protocol.

A model manager 608 receives local model information from the different maintenance systems 104. Model aggregator 610 aggregates these local models, with model trainer 612 generating a global model 614, as described above. The global model 614 is transmitted to the maintenance systems 104 by the model manager 608, providing the basis for future local model training.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for training a neural network model, comprising:
    collecting local exemplar information from a plurality of edge devices, each local exemplar having been trained using information local to the respective edge devices of the plurality of edge devices;
    aggregating the collected local exemplar information together using federated averaging;
    training global model exemplars using federated constrained clustering using a processor, performed by minimizing an objective function:

$$\min_{\phi,\{v_1,\ldots,v_K\}} -\frac{1}{N}\sum_{i=1}^{K}\sum_{l=1}^{L}\alpha_i^l p_{il}^T \log q_{il} - 1^T \log\left(\frac{1}{N}\sum_{i=1}^{K}\sum_{l=1}^{L}p_{il}\right) + \frac{1}{N}\sum_{i=1}^{K}\sum_{l=1}^{L}R(c_i^l)$$

where $\phi$ represents parameters of projection network h, $\{v_1,\ldots,v_K\}$ are latent cluster centers in an output space of h, N is a number of time series segments, K is a number of global exemplars, L is a number of edge devices, R(·) is a constraint function that encourages the projection network h to give similar embeddings for exemplars that have same initialization, $\alpha_i^l$ represents a prior distribution for an edge device l at a time i, $p_{il}$ is a target cluster membership vector for the edge device l at the time i, $q_{il}$ is a cluster membership vector for the edge device l at the time i, and $c_i^l$ is the local exemplar of the edge device l at the time i;
    transmitting the trained global exemplars to the respective edge devices of the plurality of edge devices;
    detecting an anomaly at an edge device of the plurality of edge devices with an edge device model trained using a respective trained global exemplar; and
    performing an action to correct the anomaly.

2. The method of claim 1, wherein the federated averaging includes determining an element-wise average of local exemplars.

3. The method of claim 2, wherein the federated averaging includes averaging local exemplars after matching the local exemplars by their values.

4. The method of claim 3, wherein the federated averaging includes projecting the local exemplars to a latent space and matching the local exemplars according to their respective positions in the latent space.

5. The method of claim 1, wherein training the global exemplars $\{u_1, \ldots, u_K\}$ includes:

$$u_z = \frac{1}{\sum_{i=1}^{K} \sum_{l=1}^{L} q_{il,z} c_i^l}$$

where z is an index between 1 and K.

6. The method of claim 1, wherein collecting the local exemplar information does not gather training data for the local exemplars from the edge devices.

7. The method of claim 1, further comprising repeating the collection, aggregation, training, and transmission based on updated local exemplar information from the edge devices.

8. The method of claim 1, wherein the local exemplars are trained using multivariate time series data collected by the respective edge devices.

9. The method of claim 1, wherein the trained global model exemplars are configured to recognize diverse operating conditions from cyber-physical systems associated with the plurality of edge devices.

10. A system for training a neural network model, comprising:
a hardware processor;
a network interface in communication with a plurality of edge devices, configured to collect local exemplar information from the plurality of edge devices, each local exemplar having been trained using information local to respective edge devices of the plurality of edge devices, and to transmit trained global exemplars to the respective edge devices of the plurality of edge devices; and
a memory that stores a computer program product, which, when executed by the hardware processor, causes the hardware processor to:
aggregate the collected local exemplar information together using federated averaging; and
train the global model exemplars using federated constrained clustering, performed by minimization of an objective function:

$$\min_{\phi,\{v_1,\ldots,v_K\}} -\frac{1}{N} \sum_{i=1}^{K} \sum_{l=1}^{L} \alpha_i^l p_{il}^T \log q_{il} -$$

$$1^T \log\left(\frac{1}{N} \sum_{i=1}^{K} \sum_{l=1}^{L} p_{il}\right) + \frac{1}{N} \sum_{i=1}^{K} \sum_{l=1}^{L} R(c_i^l)$$

where $\phi$ represents parameters of the projection network h, $\{v_1, \ldots, v_k\}$ are latent cluster centers in an output space of h, N is a number of time series segments, K is a number of global exemplars, L is a number of edge devices, $R(\cdot)$ is a constraint function that encourages the projection network h to give similar embeddings for exemplars that have same initialization, $\alpha_i^l$ represents a prior distribution for an edge device/at a time i, $p_{il}$ is a target cluster membership vector for the edge device/at the time i, $q_{il}$ is a cluster membership vector for the edge device/at the time i, and $c_i^l$ is the local exemplar of the edge device 1 at the time i;
detect an anomaly at an edge device of the plurality of edge devices with an edge device model trained using a respective trained global exemplar; and
perform an action to correct the anomaly.

11. The system of claim 10, wherein the computer program product further causes the hardware processor to determine an element-wise average of local exemplars for the federated averaging.

12. The system of claim 11, wherein the computer program product further causes the hardware processor to average local exemplars after matching the local exemplars by their values for the federated averaging.

13. The system of claim 12, wherein the computer program product further causes the hardware processor to project the local exemplars to a latent space and matching the local exemplars according to their respective positions in the latent space for the federated averaging.

14. The system of claim 10, wherein the computer program product further causes the hardware processor to train the global exemplars $\{u_1, \ldots, u_K\}$ with:

$$u_z = \frac{1}{\sum_{i=1}^{K} \sum_{l=1}^{L} q_{il,z} c_i^l}$$

where z is an index between 1 and K.

15. The system of claim 10, wherein the network interface does not gather training data for the model local exemplars from the edge devices.

16. The system of claim 10, wherein the computer program product further causes the hardware processor to repeat the aggregation and training based on updated local exemplar information from the edge devices.

17. The system of claim 10, wherein the local exemplars are trained using multivariate time series data collected by the respective edge devices.

18. The system of claim 10, wherein the trained global model exemplars are configured to recognize diverse operating conditions from cyber-physical systems associated with the plurality of edge devices.

* * * * *